United States Patent
Marupaduga

(10) Patent No.: US 12,328,620 B2
(45) Date of Patent: Jun. 10, 2025

(54) DYNAMICALLY DISABLING BEAMFORMING CAPABILITIES

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/400,410

(22) Filed: Dec. 29, 2023

(65) Prior Publication Data

US 2024/0137806 A1 Apr. 25, 2024

Related U.S. Application Data

(62) Division of application No. 17/225,820, filed on Apr. 8, 2021, now Pat. No. 11,902,825.

(51) Int. Cl.
| | | |
|---|---|---|
| *H04W 28/02* | (2009.01) | |
| *H04B 7/06* | (2006.01) | |
| *H04W 40/22* | (2009.01) | |

(52) U.S. Cl.
CPC ...... *H04W 28/0289* (2013.01); *H04B 7/0617* (2013.01); *H04W 40/22* (2013.01)

(58) Field of Classification Search
CPC . H04W 28/0289; H04W 40/22; H04B 7/0617
See application file for complete search history.

(56) References Cited

U.S. PATENT DOCUMENTS

| | | | |
|---|---|---|---|
| 6,870,824 B1 * | 3/2005 | Kim | H04B 7/2628 |
| | | | 370/335 |
| 9,420,474 B1 | 8/2016 | Pawar et al. | |
| 9,859,967 B1 * | 1/2018 | Pawar | H04L 5/0048 |
| 10,044,426 B1 | 8/2018 | Pawar et al. | |
| 10,135,509 B1 * | 11/2018 | Marupaduga | H04W 52/322 |
| 10,231,188 B1 | 3/2019 | Singh et al. | |
| 10,237,754 B1 * | 3/2019 | Pawar | H04B 17/345 |
| 10,368,321 B1 | 7/2019 | Sitaram et al. | |
| 10,511,525 B2 | 12/2019 | Gage et al. | |
| 10,594,390 B1 | 3/2020 | Pawar et al. | |
| 11,343,832 B1 | 5/2022 | Pawar et al. | |

(Continued)

OTHER PUBLICATIONS

Non-Final Office Action received for U.S. Appl. No. 18/400,432, mailed on Sep. 9, 2024, 12 pages.

(Continued)

*Primary Examiner* — Christopher M Crutchfield
*Assistant Examiner* — Tito Q Pham
(74) *Attorney, Agent, or Firm* — Shook Hardy & Bacon L.L.P.

(57) ABSTRACT

Systems and methods are provided for dynamically disabling beamforming for particular user devices. At a node that utilizes carrier aggregation, a node, such as an eNodeB or a gNodeB, communicates with a user device that is located at a cell edge, the communicating comprising transmitting data on at least two channels that utilize beamforming. Performance of the user device is determined to be below a predetermined threshold. When this occurs, beamforming capabilities are disabled for at least one of the at least two channels used to communicate with the user device.

20 Claims, 6 Drawing Sheets

(56) References Cited

U.S. PATENT DOCUMENTS

| | | |
|---|---|---|
| 2009/0161646 A1* | 6/2009 | Li .................. H04B 7/0417 |
| | | 370/342 |
| 2014/0086071 A1 | 3/2014 | Hu et al. |
| 2018/0034515 A1 | 2/2018 | Guo et al. |
| 2021/0014667 A1 | 1/2021 | Lovlekar et al. |
| 2021/0297128 A1 | 9/2021 | Badic et al. |
| 2021/0360575 A1 | 11/2021 | Abotabl et al. |
| 2022/0030627 A1* | 1/2022 | Hooli .................. B60T 8/172 |
| 2022/0120788 A1 | 4/2022 | Wang et al. |
| 2022/0303917 A1 | 9/2022 | Nam et al. |
| 2023/0247591 A1 | 8/2023 | Hoshizaki et al. |

OTHER PUBLICATIONS

Notice of Allowance received for U.S. Appl. No. 18/400,432, mailed on Feb. 10, 2025, 10 pages.

\* cited by examiner

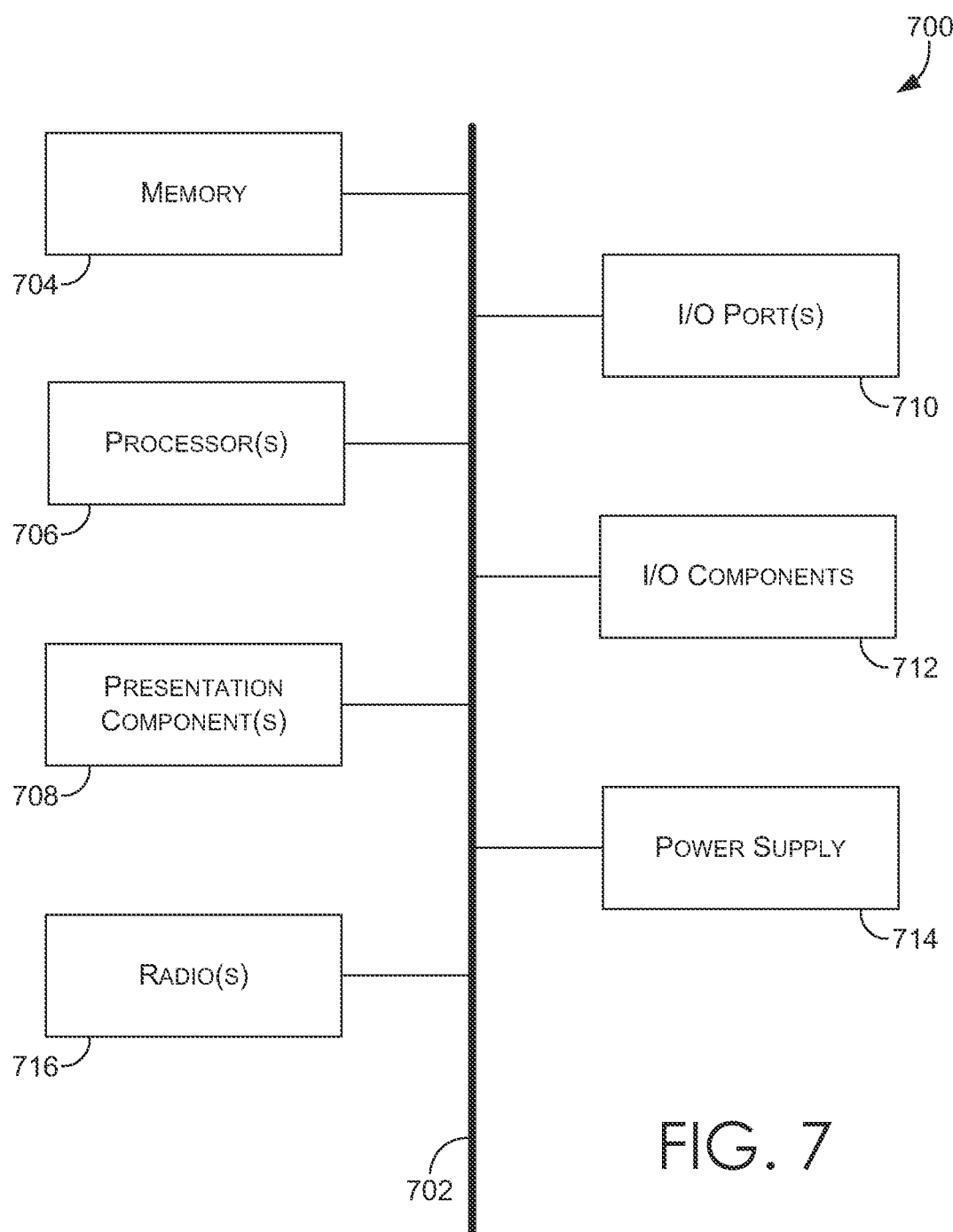

DYNAMICALLY DISABLING BEAMFORMING CAPABILITIES

CROSS-REFERENCE TO RELATED APPLICATIONS

This non-provisional patent application is a divisional of, and claims priority to, U.S. application Ser. No. 17/225,820, titled "DYNAMICALLY DISABLING BEAMFORMING CAPABILITIES," filed Apr. 8, 2021, which is incorporated by reference herein in its entirety.

The present disclosure is directed, in part, to dynamically disabling beamforming for one or more user devices with certain conditions are met. For example, when noise at a node (e.g., eNodeB, gNodeB) is above a threshold, or when a user device located at the cell edge has a low performance for some reason, beamforming may be disabled for one or more user devices located at the cell edge. Because this is a dynamic process, if conditions change, beamforming can then be enabled for those user devices. Additionally, when carrier aggregation is utilized at a node and multiple channels are used for particular user devices located at the cell edge, when user performance of one or more of these user devices is below a threshold, beamforming may be dynamically disabled for one or more of these channels. These aspects described herein allow for network resources to be more efficiently used for devices that are near or mid edge, and also the user devices for which beamforming is disabled may be able to be handed over to another sector or node to increase performance of those user devices.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein:

FIG. 7 depicts an exemplary computing environment suitable for use in implementations of the present disclosure.

DETAILED DESCRIPTION

Figure 1:
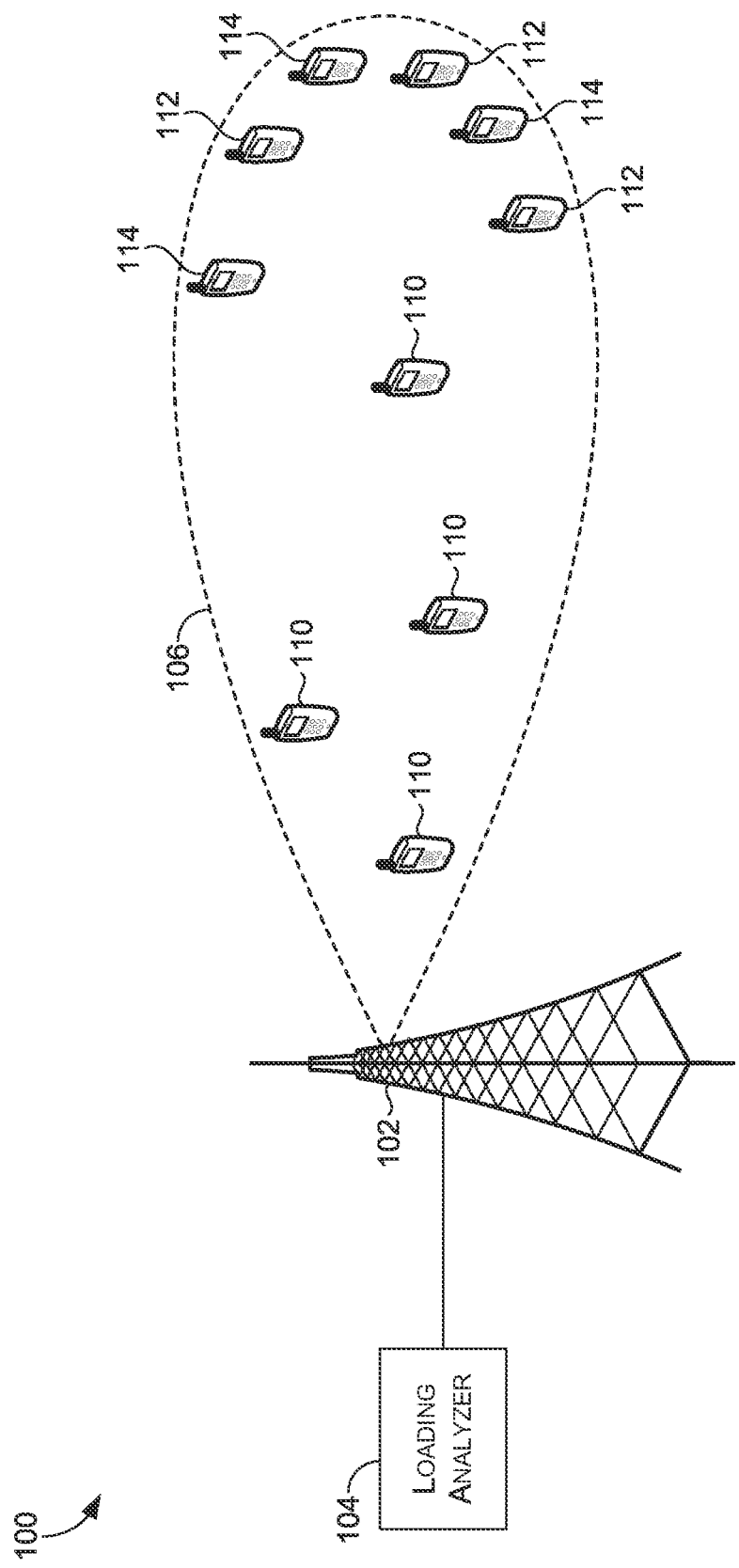
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, beamforming is commonly used by telecommunications companies for many reasons. Some of those reasons include the ability to reach select user devices (e.g., user devices at the cell edge), and to provide better speeds to user devices. However, providing coverage to certain cell edge user devices may result in decreased available resources for other user devices when the network is highly loaded. For example, on a given sector with 100 user devices where beamforming is utilized, if 10 of those user devices are cell edge user devices that are provided coverage in the sector by the node, the other 90 user devices may experience decreased performance, as resources are being redirected from those 90 user devices to the 10 cell edge user devices. In aspects described herein, beamforming may be disabled for cell edge user devices when loading on a sector is high. In some aspects, beamforming may not be disabled for high power user equipment (HPUE) or for relay devices.

In the instance where there are cell edge user devices, some of these cell edge user devices may be transmitting at a very high power based on their distance from the node. When transmitting at a high power, such as above some predetermined threshold, excess noise is created at the base station. This noise can create issues for the network and even for the other user devices not at the cell edge. In other words, the user devices not at the cell edge may be operating normally with high performance, but when the cell edge user devices start to transmit at a very high power, this high performance can be effected. In some aspects described herein, when this is the case, the node may decide to discontinue beamforming for one or more of the cell edge user devices. This may cause a handover of the cell edge user devices to a neighboring sector or node, which would improve performance for the user devices not at the cell edge, and in some instances, also for the cell edge user devices.

Carrier aggregation is used oftentimes to increase bandwidth, thereby increasing the bitrate. Using carrier aggregation, multiple carriers (e.g., frequency blocks), each referred to as a component carrier, are assigned to the same user device. The maximum potential data rate per user device increases as more component carriers are assigned to a user. Each component carrier has an individual bandwidth, which are then combined to get a total bandwidth. In aspects herein, performance of user devices at the cell edge of a sector is monitored. Once performance of one of more of those user devices is below a threshold, beamforming may be disabled for one or more of the component carriers used by those one or more user devices. For example, if three carrier components are assigned to a user device located at the cell edge of a sector, if performance of that user device is poor, beamforming may be disabled on one or two of the carrier components.

A first aspect of the present disclosure is directed to a system for dynamically disabling beamforming for particular user devices. The system includes a processor and one or more computer storage hardware devices storing computer-usable instructions that, when used by the processor, cause the processor to perform various steps. These steps include determining that loading on a sector of a node is above a predetermined threshold, the sector utilizing beamforming, and determining that one or more user devices are located at a cell edge of the sector. Further, these steps include determining that at least one of the one or more user devices is a high-powered user device or a relay device, and disabling the beamforming for the one or more user devices that are located at the cell edge of the sector, except for the at least one or more user devices that are located at the cell edge and that are the high-powered user device or the relay device.

A second aspect of the present disclosure is directed to a method for dynamically disabling beamforming for particular user devices. The method includes determining that a noise level at a node that serves one or more user devices is above a predetermined threshold. The node utilizes beamforming for communicating with the one or more user devices. Further, the method includes, based on at least one factor, selecting at least one user device of the one or more user devices for which to disable beamforming capabilities, and disabling beamforming for the at least one user device.

According to another aspect of the technology described herein, a method is provided for dynamically disabling beamforming for particular user devices. The method includes, at a node that utilizes carrier aggregation, communicating with a user device that is located at a cell edge. The communication includes transmitting data on two or more channels that utilize beamforming. The method further includes determining that a performance of the user device is below a predetermined threshold, and disabling beamforming capabilities for at least one of the two or more channels used to communicate with the user device.

FIG. 1 depicts a diagram of an exemplary network environment 100 suitable for use in implementations of the present disclosure. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes node 102, loading analyzer 104, coverage area 106, and multiple user devices. User devices 110 are mid-cell user devices, or user devices that are not located at the cell edge. User devices 112 are cell edge user devices, and user devices 114 are cell edge user devices that are either HPUEs or relay devices. In aspects, relay devices may be devices that act as a backhaul provider for small cells. As such, beamforming would not be disabled for relay devices using aspects provided herein. In network environment 100, user devices 110, 112, and 114 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 800) that communicates via wireless communications with node 102 in order to interact with a public or private network.

In some aspects, the user devices 110, 112, and 114 may correspond to computing device 700 in FIG. 7. Thus, a user device can include, for example, a display(s), a power source(s) (e.g., a battery), a data store(s), a speaker(s), memory, a buffer(s), a radio(s) and the like. In some implementations, a user device (such as user devices 110, 112, and 114) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, user devices 110, 112, and 114 in network environment 100 can optionally utilize a network (not shown) to communicate with other computing devices (e.g., a mobile device(s), a server(s), a personal computer(s), etc.) through node 102. The network may be a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. The network can include multiple networks, as well as being a network of networks, but is shown in more simple form so as to not obscure other aspects of the present disclosure.

The network can be part of a telecommunication network that connects subscribers to their immediate service provider. In some instances, the network can be associated with a telecommunications provider that provides services (e.g., voice, data, SMS) to user devices, such as user devices 110, 112, and 114. For example, the network may provide voice and non-voice services, including SMS, and/or data services to user devices or corresponding users that are registered or subscribed to utilize the services provided by a telecommunications provider. The network can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, node 102 is configured to communicate with user devices, such as user devices 110, 112, and 114 that are located within the geographical area, or cell, covered by the one or more antennas of node 102. Node 102 may include one or more base stations, nodes, base transmitter stations, radios, antennas, antenna arrays, power amplifiers, transmitters/receivers, digital signal processors, control electronics, GPS equipment, and the like. In one aspect, node 102 is a gNodeB, while in another aspect, node 102 is an eNodeB. In particular, user devices 110, 112, and 114 may communicate with node 102 according to any one or more of a variety of communication protocols, in order to access the network.

In aspects, user devices 110, 112, and 114 may be capable of communicating using 4G (e.g., LTE) and 5G. In some aspects, user devices 110, 112, and 114 may be E-UTRAN New Radio—Dual Connectivity devices (ENDC). ENDC allows a user device to connect to an LTE eNodeB that acts as a master node and a 5G gNodeB that acts as a secondary node. As such, in these aspects, user devices 110, 112, and 114 may access both LTE and 5G simultaneously, and in some cases, on the same spectrum band. As shown in FIG. 1, user devices 110, 112, and 114 communicate by way of transmission with node 102 using one or more of 4G and 5G, sometimes simultaneously. Additionally, other wireless communication protocols may be utilized in conjunction with aspects described herein, as LTE and 5G are used for exemplary purposes only and not for limitation.

In aspects, loading analyzer 104 is responsible for monitoring the loading on a particular sector. The loading analyzer 104 may be a network component, such as part of node 102. Alternatively, loading analyzer 104 may be located elsewhere and not at or near node 102. When loading analyzer 104 determines that loading at the node 102 or at a particular sector of node 102 is at or above a predetermined threshold, it may notify another network component, such as node 102, so that node 102 can take action to determine which cell edge user devices are to have beamforming disabled. Node 102 would then make a selection of user devices that are to have beamforming disabled. In aspects herein, beamforming may be disabled for one or more cell edge users. However, beamforming may not be disabled for HPUEs or relay devices. These types of devices have a greater need for continued beamforming services. If loading analyzer 104 is monitoring loading and loading remains below the threshold, beamforming may be continued for all user devices, even cell edge user devices. Referring to FIG. 1, if loading analyzer 104 determines that loading is above a predetermined threshold, node 102 may determine to disable beamforming for one or more of user devices 112. User devices 114 are either HPUEs or relay devices, and thus beamforming would not be disabled for these devices.

Figure 2:
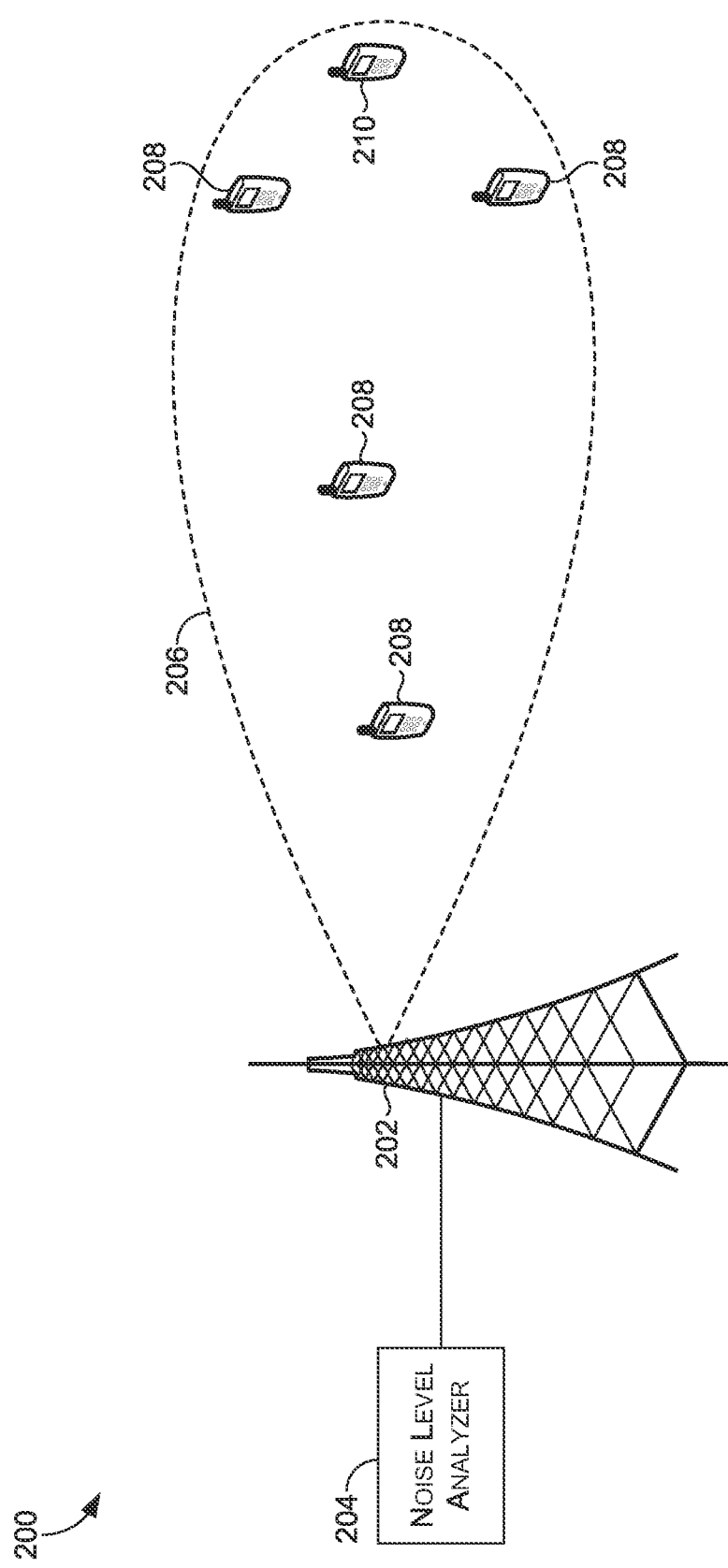
FIG. 2 depicts a diagram of an exemplary computing environment suitable for use in implementations of the present disclosure.

FIG. 2 depicts a diagram of an exemplary computing environment 200 suitable for use in implementations of the present disclosure. Many of the same details discussed above in relation to FIG. 1 regarding the environment as a whole apply here to FIG. 2, and thus will not be repeated for brevity. FIG. 2 includes node 202 (e.g., eNodeB, gNodeB), noise level analyzer 204, coverage area 206, and user devices 208 and 210. In one aspect, high interference or noise at node 202 can cause numerous issues, such as interfering with service to some of the connected user devices. In some instance, high noise or interference at node 202 may be caused by one or more user devices, such as user device 210 that is located at the cell edge. User device 210 may be transmitting at a high power. In aspects herein, when this occurs, beamforming may be disabled for user device 210, but not for user devices 208, as user device 210 is causing the high noise or interference at node 202. When this happens, a handover may occur and user device 210 may receive service from a neighboring node. User devices 208 may continue receiving service from node 202 and may even have improved user device performance, as user device 210 that was transmitting at a high power causing high noise has been removed from receiving beamforming from node 202. While a single user device, user device 210 is depicted in FIG. 2 as being a cell edge user device that was identified as transmitting at a high power, more than one user device could have been identified. In this case, beamforming may be disabled for multiple devices.

In one aspect in relation to FIG. 2, beamforming may be disabled for only certain user devices, not just any user device that is transmitting at a high power. For example, beamforming may be disabled for just those user devices transmitting on both 4G and 5G nodes, such as devices that support dual-connectivity with new radio (DCNR). As such, only particular devices that are at the cell edge and transmitting at a high power may have beamforming disabled. In some instance, when noise or interference at node 202 is above an even higher threshold than the first threshold, all cell edge user devices may have beamforming disabled instead of just those user devices that are cell edge and broadcasting at a high power.

Figure 3:
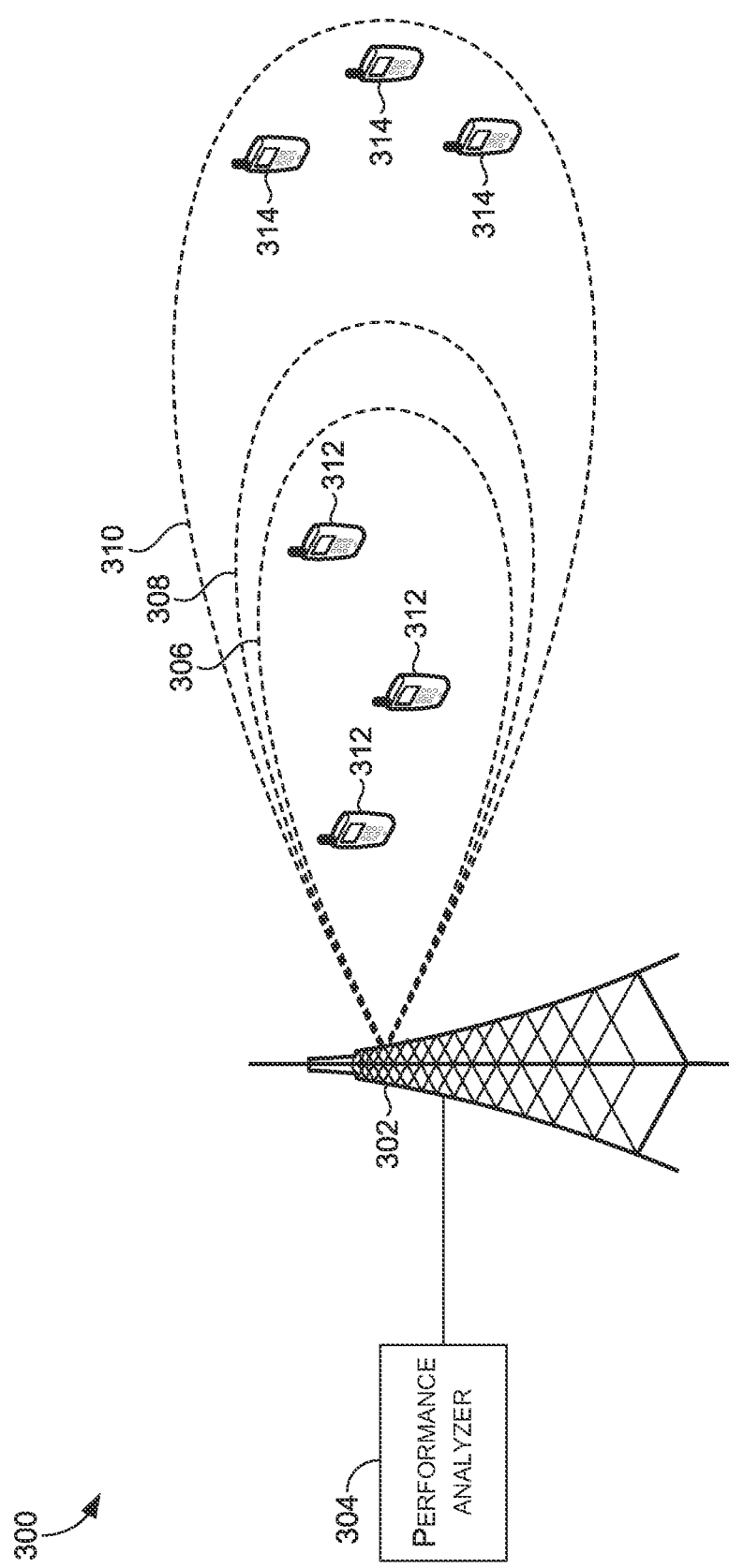
FIG. 3 depicts a diagram of an exemplary computing environment suitable for use in implementations of the present disclosure.

Turning now to FIG. 3, FIG. 3 depicts a diagram of an exemplary computing environment 300 suitable for use in implementations of the present disclosure. Many of the same details discussed above in relation to FIG. 1 regarding the environment as a whole apply here to FIG. 3, and thus will not be repeated for brevity. FIG. 3 includes node 302, performance analyzer 304, component carriers 306, 308, and 310 (also referred to herein as channels), and user devices 312 and 314. In aspects, node 302 utilizes carrier aggregation, which combines multiple paths to provide higher data rates to user devices. For example, multiple component carriers are combined to provide higher data speeds. In aspects, performance analyzer 304 monitors performance of the user devices 312 and 314 within a given sector. Initially, user devices 312 and 314 may all be covered by channels 306, 308, and 310 (not shown). For example and not limitation, channels 306, 308, and 310 may all be capable of beamforming, which may, at a particular time, be enabled for all user devices 312 and 314. Beamforming generally allows cell edge user devices to have better RF conditions and connect to node 302. Without beamforming, it may not be conducive for cell edge user devices to have high performance while operating on these carriers. They may have higher performance connecting to a neighboring sector or node.

In one aspect, all user devices, even user devices 314 at the cell edge may receive coverage from all of channels 306, 308, and 310 (e.g., utilizing carrier aggregation). But when performance analyzer 304 detects that performance of one or more of user devices 314 at the cell edge is below a threshold, beamforming capabilities may be dynamically disabled for one or more of the channels that cover user devices 314. For instance, only channel 306 may have beamforming capabilities disabled for user devices 314, and in other instances, both channels 306 and 308 may have beamforming capabilities dynamically disabled for user devices 314, as is shown in FIG. 3. Here, user devices 314 only receive coverage, including beamforming, from channel 310. This results in these unused resources being redirected to the near cell or middle cell (non-cell edge user devices 312), resulting in better performance. Additionally, network resources are conserved and not used for user devices 314 that are already experiencing poor performance. In some aspects, other factors are considered before beamforming is disabled from any of the channels. For instance, the magnitude of performance and the quantity of cell edge user devices may be used. As mentioned, just one channel may have beamforming dynamically disabled, or multiple channels may have beamforming dynamically disabled.

Figure 4:
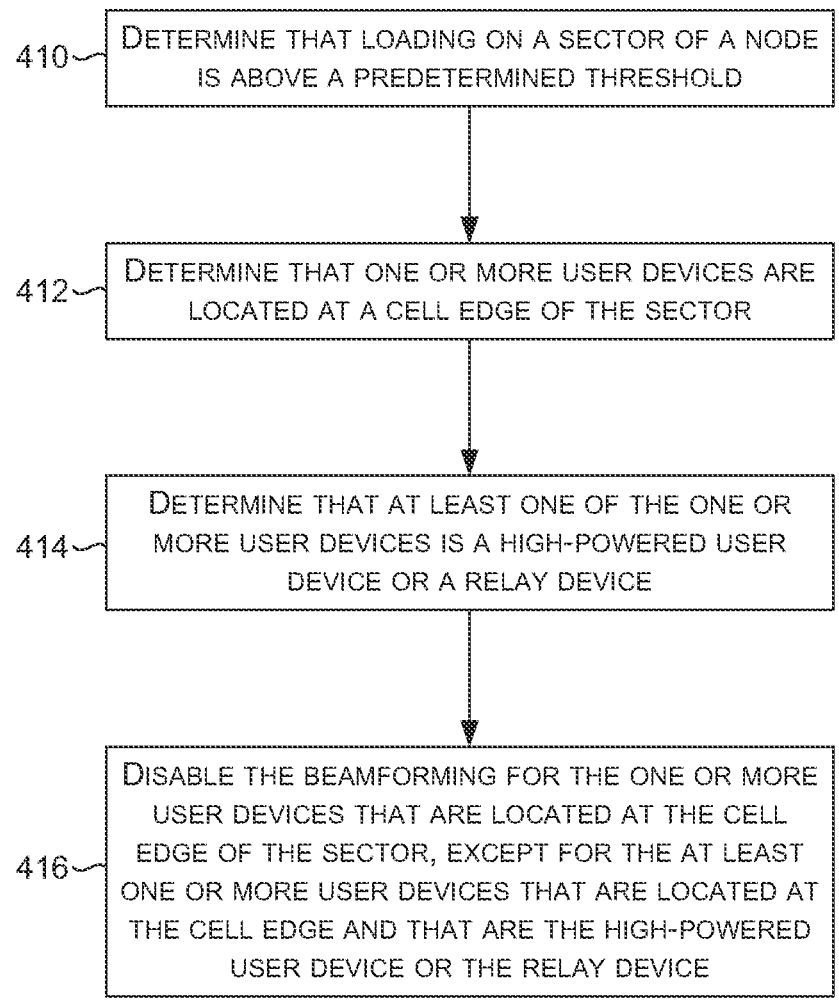
FIGS. 4-6 depict flow diagrams of exemplary methods for dynamically disabling beamforming for particular user devices, in accordance with aspects herein.

FIG. 4 depicts a flow diagram of an exemplary method 400 for dynamically disabling beamforming for particular user devices, in accordance with aspects herein. At block 410, it is determined that loading on a sector of a node is above a predetermined threshold. At block 412, it is determined that one or more user devices are located at a cell edge of the particular sector. Additionally, it may be determined that at least one of these user devices are experiencing poor radio frequency conditions, resulting in poor performance. At block 414, it is determined that at least one user device is a special device, such as a HPUE or a relay device. In some aspects, the user devices send a signal or message to the node indicating what type of device each is, and/or the capabilities of that user device, which assists the node to determine which user devices at the cell edge are to have beamforming disabled. At block 416, beamforming for the one or more user devices located at the cell edge of the sector is disabled, but beamforming is not disabled for any special devices, such as any HPUEs or relay devices. This allows network resource to be allocated to other user devices within the sector, such as cell near or cell middle user devices (e.g., those that are not on the cell edge). In aspects, once beamforming has been disabled for one or more user devices, once the loading on that sector has decreased, such as decreased to below the predetermined threshold, the node may make a determination to enable beamforming for those user devices.

Figure 5:
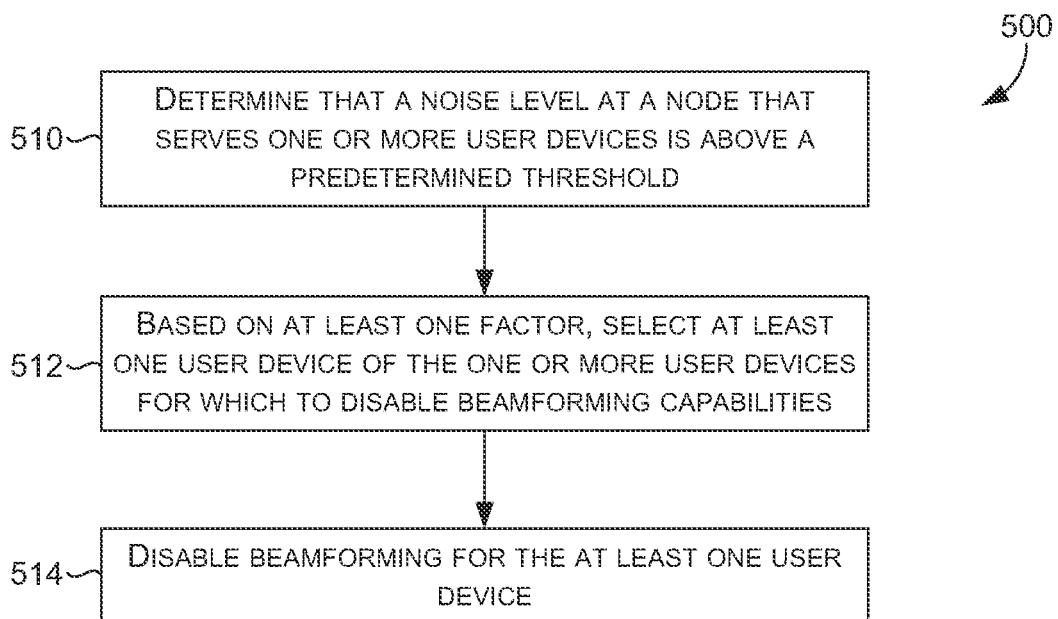

FIG. 5 depicts a flow diagram of an exemplary method 500 for dynamically disabling beamforming for particular user devices, in accordance with aspects herein. At block 510, it is determined that a noise level at a node that serves user devices is above a predetermined threshold. In aspects, the node utilizes beamforming for communicating with the user devices. At block 512, at least one user device is selected for which to disable beamforming capabilities. This selection may be based on one or more factors, such as whether the user devices are located at the cell edge, and/or whether the user devices are transmitting at a high power, which can cause interference and/or noise at the node. A user device, especially one located at the cell edge, may be transmitting at a high power because it is experiencing poor radio frequency conditions. At block 514, beamforming is disabled for that at least one user device. In one aspect, the user device for which beamforming is disabled is capable of DCNR, and thus can communicate using both 4G and 5G.

In aspects, the noise level may not only be higher than the predetermined threshold, as described above, but may be so high that it is higher than a second threshold that is higher than the first threshold. In this instance, beamforming may be disabled for all user devices that are located at the cell edge of the node, not just for the user devices that are transmitting at a high power.

Figure 6:
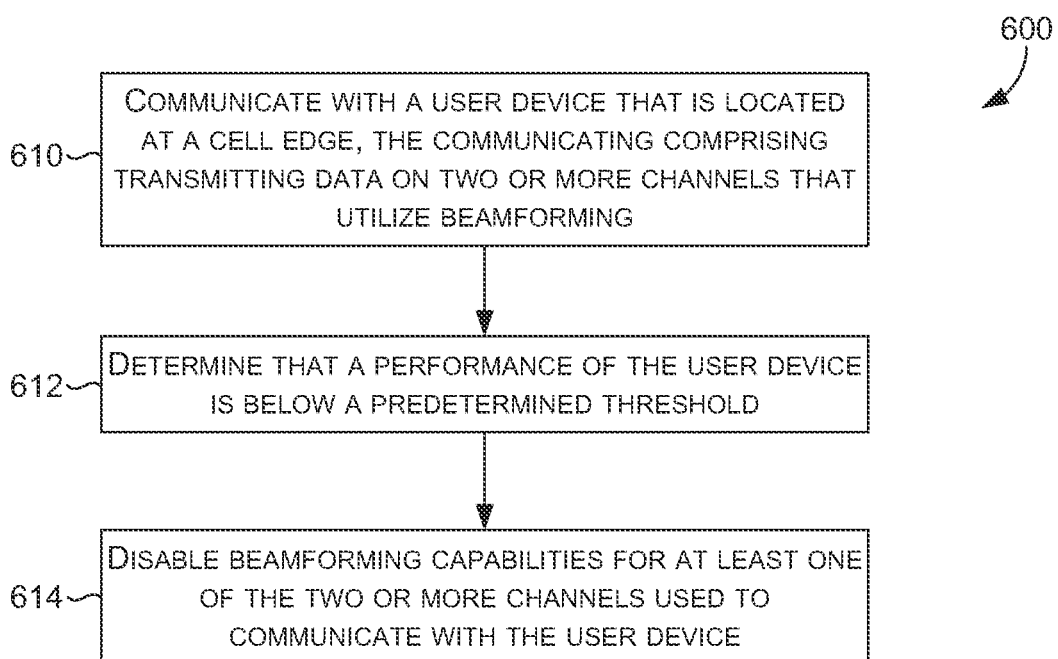

FIG. 6 depicts a flow diagram of an exemplary method 600 for dynamically disabling beamforming for particular user devices, in accordance with aspects herein. At block 610, a node communicates with a user device that is located at the cell edge. The node may be transmitting data on two or more channels that utilize beamforming. At block 612, it is determined that a performance of the user device is below a predetermined threshold. This could be due to poor radio frequency conditions. A quantity of user devices located at the cell edge may also be determined. In some aspects, another factor used to determine when and which channels are to have disabled beamforming for cell edge user devices is the quantity of user devices at the cell edge being above a threshold. At block 614, beamforming capabilities are disabled for at least one of the channels used to communicate with the user device.

Referring to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 702 that directly or indirectly couples the following devices: memory 704, one or more processors 706, one or more presentation components 708, input/output (I/O) ports 810, I/O components 712, and power supply 714. Bus 702 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component such as a display device to be one of I/O components 712. Also, processors, such as one or more processors 706, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 704 includes computer-storage media in the form of volatile and/or nonvolatile memory. Memory 704 may be removable, nonremovable, or a combination thereof. Exemplary memory includes solid-state memory, hard drives, optical-disc drives, etc. Computing device 700 includes one or more processors 706 that read data from various entities such as bus 702, memory 704 or I/O components 712. One or more presentation components 8708 presents data indications to a person or other device. Exemplary one or more presentation components 708 include a display device, speaker, printing component, vibrating component, etc. I/O ports 710 allow computing device 700 to be logically coupled to other devices including I/O components 712, some of which may be built in computing device 700. Illustrative I/O components 712 include a microphone, joystick, game pad, satellite dish, scanner, printer, wireless device, etc.

Radio 716 represents a radio that facilitates communication with a wireless telecommunications network. Illustrative wireless telecommunications technologies include CDMA, GPRS, TDMA, GSM, and the like. Radio 716 might additionally or alternatively facilitate other types of wireless communications including Wi-Fi, WiMAX, LTE, or other VoIP communications. As can be appreciated, in various embodiments, radio 716 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method for dynamically disabling beamforming for particular user devices, the method comprising:
   at a node that utilizes carrier aggregation, communicating with a cell edge user device that is located at a cell edge and communicating with a non-cell edge user device, the communicating comprising transmitting data on two or more channels that utilize beamforming;
   determining that a performance of the cell edge user device is below a predetermined threshold; and
   disabling beamforming capabilities for at least one of the two or more channels used to communicate with the cell edge user device while maintaining beamforming capabilities for the two or more channels to communicate with the non-cell edge user device.

2. The method of claim 1, wherein the cell edge user device is handed over to a neighboring node.

3. The method of claim 1, further comprising determining a quantity of cell edge user devices located at the cell edge.

4. The method of claim 3, further comprising determining that the quantity of cell edge user devices located at the cell edge is above a predetermined threshold.

5. The method of claim 1, wherein the determining that the performance of the cell edge user device is below the predetermined threshold further comprises determining how far the performance of the cell edge user device is below the predetermined threshold.

6. The method of claim 1, wherein the performance of the cell edge user device being below the predetermined threshold is caused, at least, by the user device experiencing poor radio frequency conditions.

7. The method of claim 1, wherein the communicating comprises transmitting data on three channels that utilize beamforming, and wherein disabling beamforming capabilities for at least one of the two or more channels comprises disabling two channels that utilize beamforming for the cell-edge user device while maintaining the three channels to communicate with the non-cell edge user device.

8. A system for dynamically disabling beamforming for particular user devices, the system comprising:
   one or more network components configured to perform a method comprising:
   at a node that utilizes carrier aggregation, communicating with a cell edge user device that is located at a cell edge and communicating with a non-cell edge user device, the communicating comprising transmitting data on two or more channels that utilize beamforming;
   determining that a performance of the cell edge user device is below a predetermined threshold; and
   disabling beamforming capabilities for at least one of the two or more channels used to communicate with the cell edge user device while maintaining beamforming capabilities for the two or more channels to communicate with the non-cell edge user device.

9. The system of claim 8, wherein the cell edge user device is handed over to a neighboring node.

10. The system of claim 8, further comprising determining a quantity of cell edge user devices located at the cell edge.

11. The system of claim 10, further comprising determining that the quantity of cell edge user devices located at the cell edge is above a predetermined threshold.

12. The system of claim 8, wherein the determining that the performance of the cell-edge user device is below the predetermined threshold further comprises determining how far the performance of the cell-edge user device is below the predetermined threshold.

13. The system of claim 8, wherein the performance of the cell edge user device being below the predetermined threshold is caused, at least, by the cell edge user device experiencing poor radio frequency conditions.

14. The system of claim 8, wherein the communicating comprises transmitting data on three channels that utilize beamforming, and wherein disabling beamforming capabilities for at least one of the two or more channels comprises disabling two channels that utilize beamforming for the cell edge user device while maintaining the three channels to communicate with the non-cell edge user device.

15. One or more non-transitory computer-readable media having computer-executable instructions embodied thereon that, when executed, perform a method for dynamically disabling beamforming for particular user devices, the method comprising:
   at a node that utilizes carrier aggregation, communicating with a cell edge user device that is located at a cell edge and communicating with a non-cell edge user device, the communicating comprising transmitting data on two or more channels that utilize beamforming;
   determining that a performance of the cell edge user device is below a predetermined threshold; and
   disabling beamforming capabilities for at least one of the two or more channels used to communicate with the cell edge user device while maintaining beamforming capabilities for the two or more channels to communicate with the non-cell edge user device.

16. The media of claim 15, wherein the communicating comprises transmitting data on three channels that utilize beamforming, and wherein disabling beamforming capabilities for at least one of the two or more channels comprises disabling two channels that utilize beamforming for the cell-edge user device while maintaining the three channels to communicate with the non-cell edge user device.

17. The media of claim 15, further comprising determining a quantity of cell edge user devices located at the cell edge.

18. The media of claim 17, further comprising determining that the quantity of cell edge user devices located at the cell edge is above a predetermined threshold.

19. The media of claim 15, wherein the determining that the performance of the cell edge user device is below the predetermined threshold further comprises determining how far the performance of the cell edge user device is below the predetermined threshold.

20. The media of claim 15, wherein the performance of the cell edge user device being below the predetermined threshold is caused, at least, by the cell edge user device experiencing poor radio frequency conditions.

* * * * *